United States Patent Office 3,523,717
Patented Aug. 11, 1970

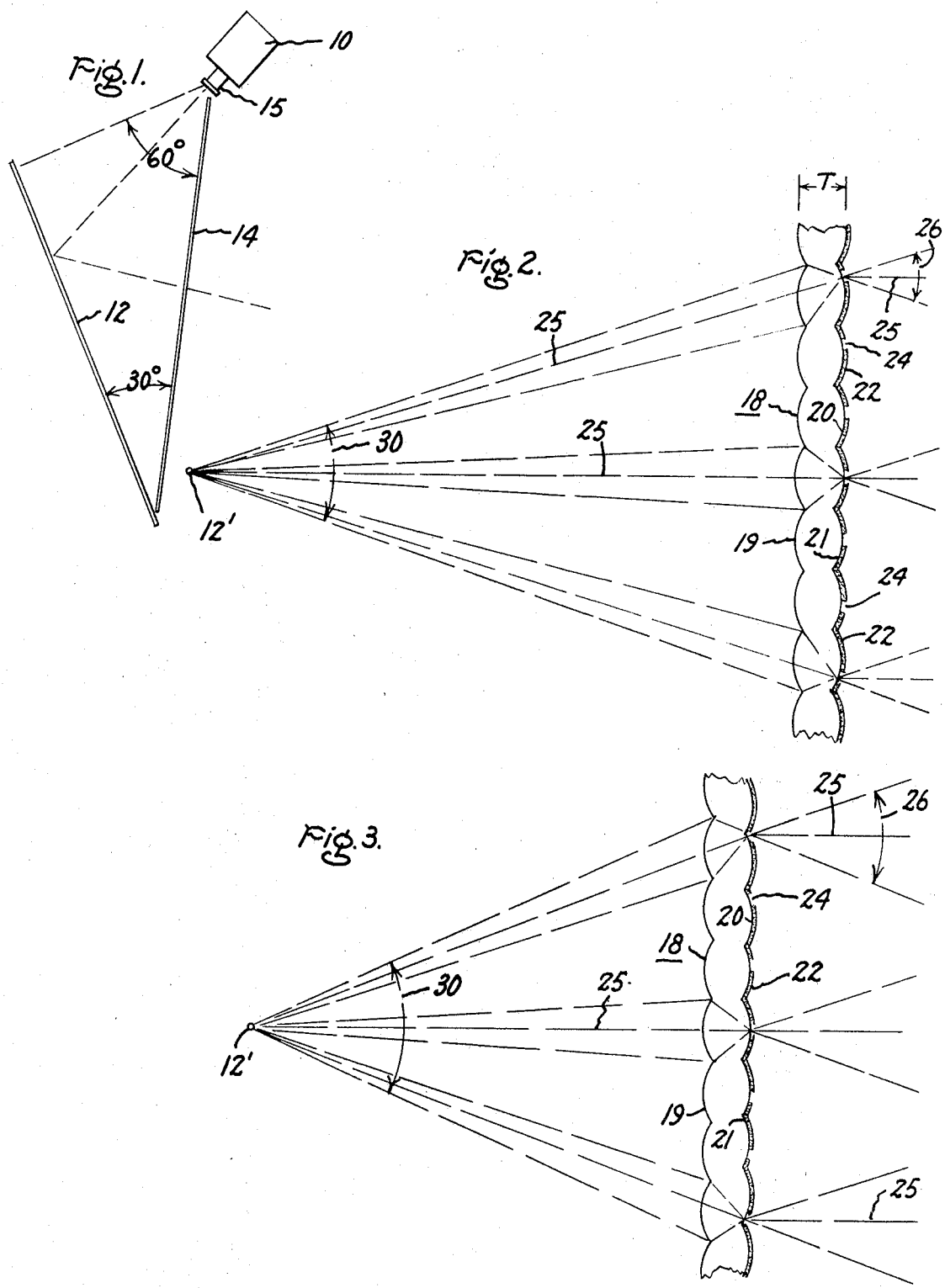

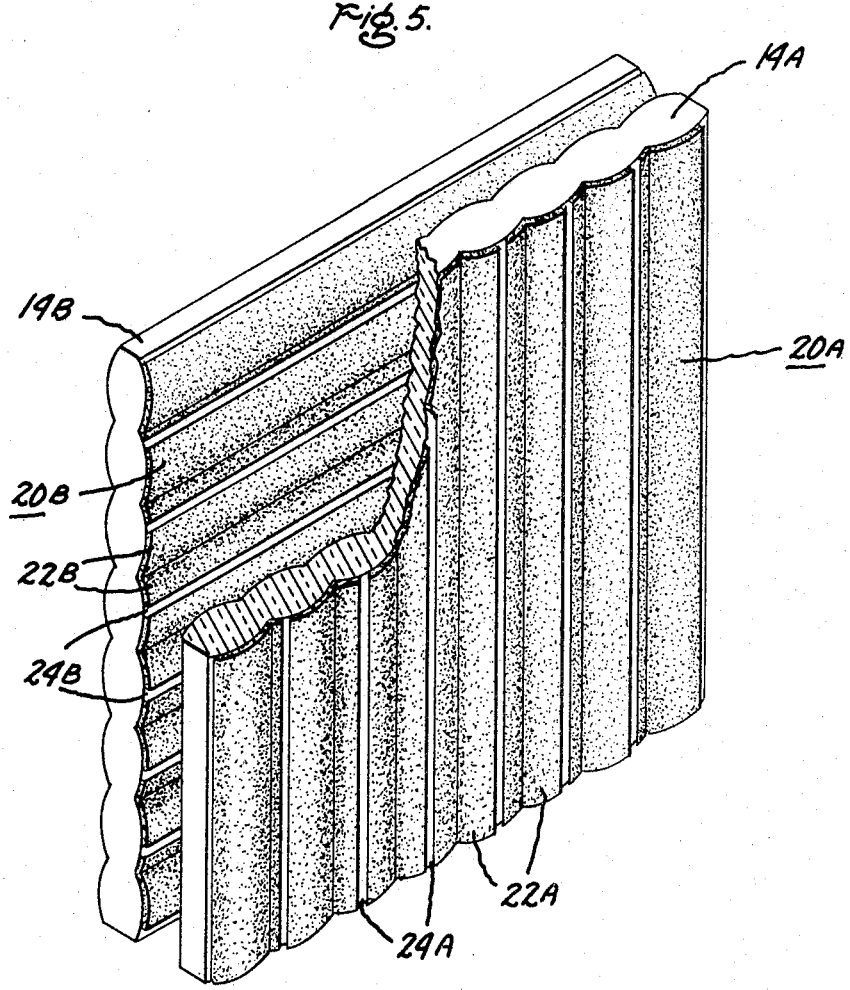

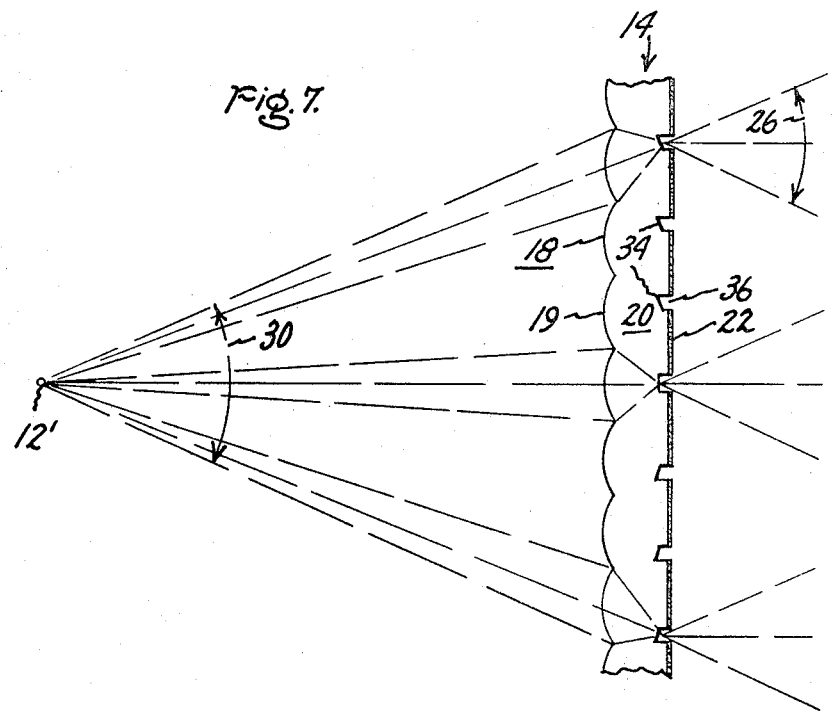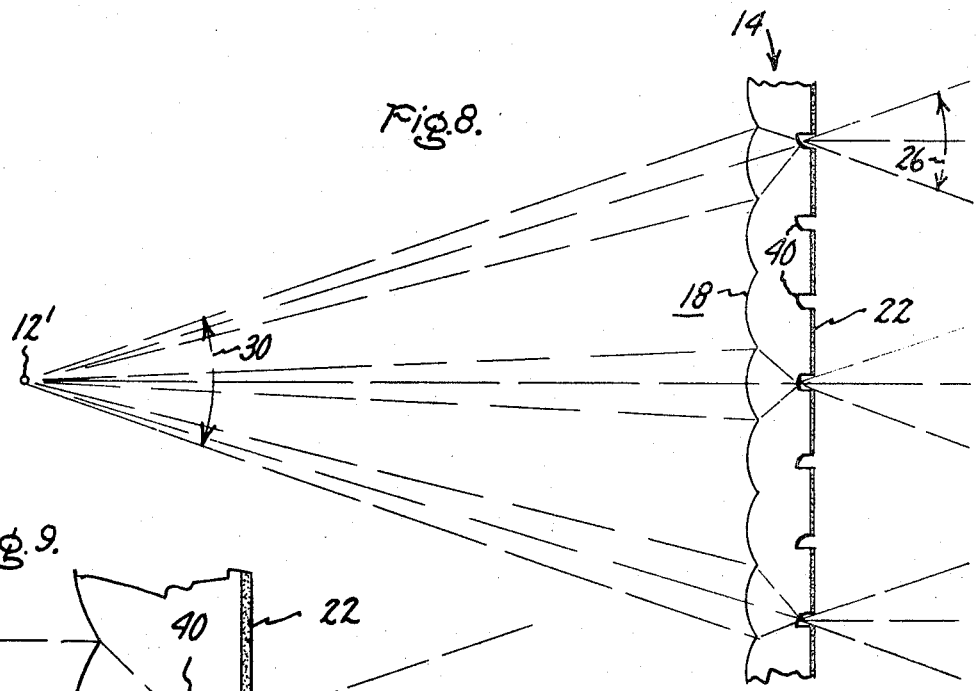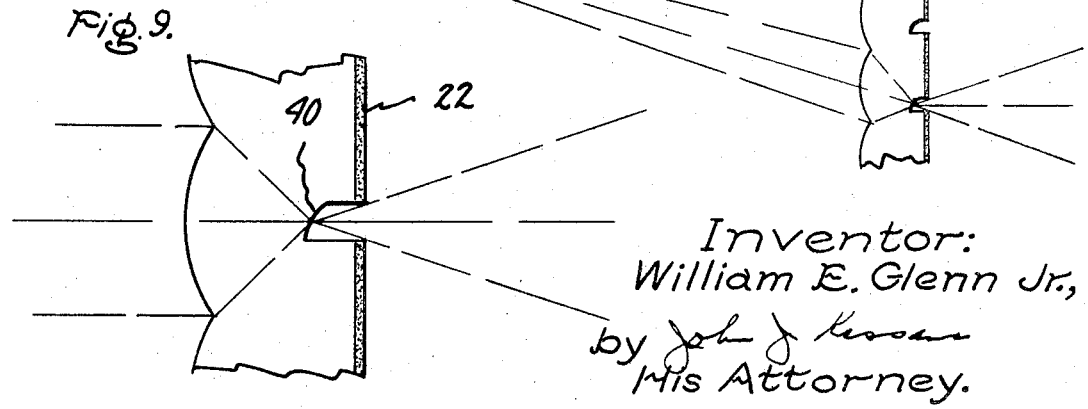

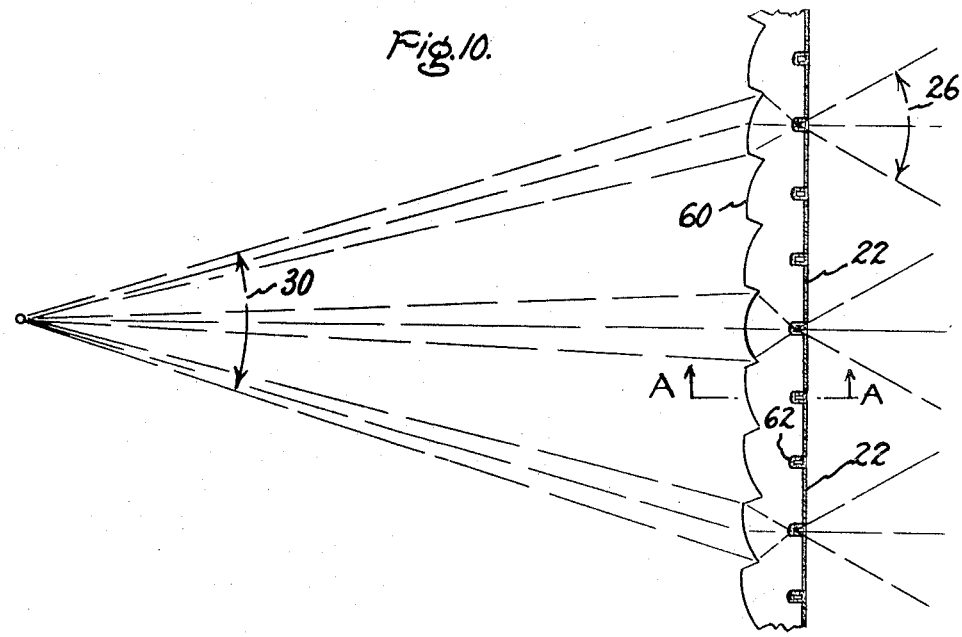
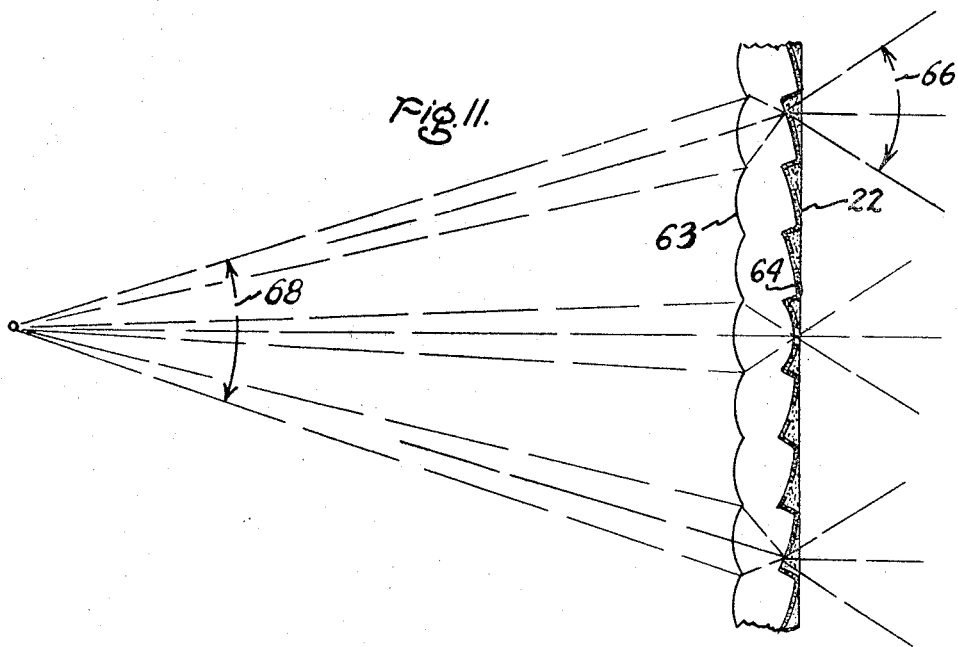

3,523,717
COMPOSITE BACK PROJECTION SCREEN
William E. Glenn, Jr., Scotia, N.Y., assignor to General Electric Company, a corporation of New York
Filed Feb. 1, 1967, Ser. No. 613,323
Int. Cl. G03b 21/56, 21/60
U.S. Cl. 350—123
13 Claims

ABSTRACT OF THE DISCLOSURE

Composite back projection screens are described characterized by a cylindrically lenticulated back face and a selectively darkened front face having refracting lens components positioned at the undarkened foci of the back lenticules. The refracting lens components are formed either by selectively notching a Fresnel lens into the flat front face of the projection screen or by lenticulating the front face of the screen and utilizing an appropriate portion of the lenticules' arcual surface as the refracting lens components. Control of both the horizontal and the vertical viewing angles is accomplished by the formation of refracting lens components in both faces of a unitary screen in optical registration with spherical lens components situated along the back face of the unitary screen.

---

Figure 4:
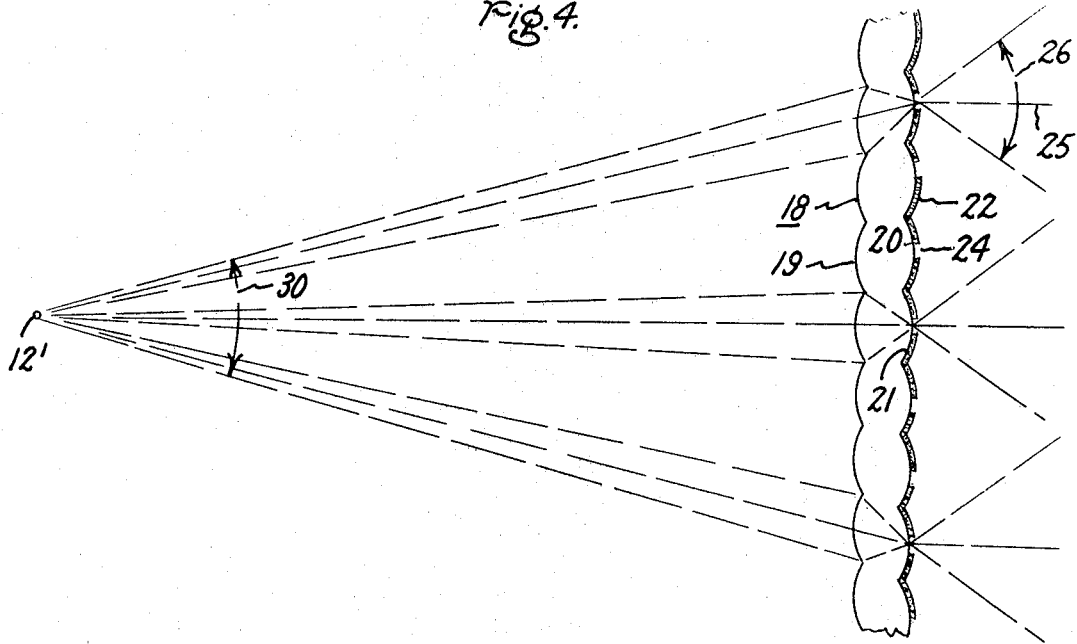

This invention relates to a back projection screen for pictorially displaying upon the selectively darkened front face of the screen an image projected upon the back face of the screen and in particular to a high gain composite back projection screen having lenticular lens components situated along the back face of the screen and refracting lens components integrally formed in the front surface of the projection screen in optical registration with the lenticular lens components.

The commercial desirability of thin depth cabinet structures as furniture pieces has revived the interest of designers in back projection systems in attempts to alter the generally cubic configuration of conventional pictorial display devices. In general, thin depth back projection systems employ a reflecting surface to transmit the impinging light from a projector to the back surface of a projection screen in order to produce an image viewable upon the selectively darkened front face of the screen. High gain back projection screens heretofore utilized to obtain high contrast viewing generally have been characterized by a lenticular back face and a flat front face with the thickness of the screen being so dimensioned that the foci of the lenticules forming the back face are situated at intervals along the surface of the front face of the screen. The front face is blackened at all points except for the locations of the foci of the lenticules to provide the darkened appearance necessary for good viewing in a normal room illumination of approximately three foot candles. Because the undarkened portion of the flat surface lies on a flat plane within the direct viewing angle of the observer without obscurity by the darkened overcoating, the contrast ratio of the front face of the screen is limited. Furthermore, the employment of a wide angle projection lens to minimize the distance from the projector to the reflecting surface generally produces hot spots, e.g. areas of high intensity illumination, at the center of the viewing screen particularly when the projection angle exceeds 35°. Prior attempts to inhibit the formation of hot spots by the utilization of a refracting lens, e.g. Fresnel lens, situated intermediate the projector and the back face of the projection screen to diffuse the light rays at the center of the screen have been unsuccessful because of the formation of circular patterns, or moire, produced by the reinforcement of selected light rays passing through the separate lenticular and Fresnel lens elements. Furthermore, the obtainable contrast of the screen is reduced because of multiple reflections between the surfaces of the aligned lenses.

It is therefore an object of this invention to provide a composite back projection screen particularly useful for wide projection angles, i.e. angles in excess of 35°, without the formation of areas of high intensity illumination at the center of the screen.

It is a further object of this invention to provide a high contrast composite back projection screen having incorporated therein optically aligned focusing lens and refracting lens components to inhibit the formation of moire.

It is also an object of this invention to provide a high contrast composite back projection screen having a maximum viewing angle for a given screen thickness.

It is another object of this invention to provide a back projection screen configuration which can be selectively darkened after fabrication with a minimum of difficulty.

These and other objects of this invention generally are accomplished by the formation of the back projection screen as a composite structure having refracting lens components and focusing lens components integrally formed within the surface of a single projection screen. The focusing lens components are situated along the back face of the projection screen proximate the image to be viewed and the radius of curvature of the focusing lens components are so dimensioned relative to the thickness of the screen that the foci of the focusing lens components are located along the front face of the screen. Refracting lens components are formed in the screen in optical registry with the focusing lens components and the front face of the screen is covered with a darkened overcoating at all locations except the foci of the focusing lens components. The alignment of the refracting lens components with the focusing lens components inhibits the formation of moire while the incorporation of both lens components upon a single projection screen reduces multiple reflections between the surfaces of the aligned lenses. Because the focusing lens components forming the back face of the projection screen are small, e.g. preferably cylindrical lenses less than 50 mils in arcual span, effective optical registration of the refracting lens components and the focusing lens components generally can be accomplished only by the formation of both the refracting lens components and the focusing lens components in a single projection screen. Although the refracting lens elements preferably are located along the front face of the projection screen because of the relative ease of manufacture of a projection screen so oriented, the refracting lens elements also can be incorporated with the focusing lens elements along the rear face of the projection screen to form a composite lens.

Because of the resistivity of the screen to the formation of hot spots, a preferred usage contemplated for the composite screen of this invention is in wide angle back projection devices wherein an image projected upon a mirrored surface is reflected to the back face of the projection screen in order to produce a viewable picture upon the selectively darkened front face of the screen remote from the mirrored surface.

In the construction of the projection screen of this invention, focusing lens components are formed along the back face of the screen and refracting lens components are shaped into the screen in optical registry with the focusing lens components. The thickness of the screen and the radius of curvature of the focusing lens components are interrelated so that the foci of the focusing lens components are situated along the front face of the projection screen. The front surface of the screen then is coated with a dark overlayer at all points except the foci of the focusing lens components to provide the high contrast necessary for high quality pictorial displays.

In a simplified method of forming a composite projection screen having refracting lens elements situated along the front face of the screens, both faces of the transparent projection screen are lenticulated in the same direction with at least the center lenticules of the front and back faces being aligned in direct opposition. A selected portion of each front lenticule situated at the foci of the back lenticules then is utilized as the refracting lens component to orient the light rays passing therethrough.

Another suitable method of forming the composite screen of this invention includes lenticulating the back face of the screen and notching a Fresnel lens internally of a generally flat front face projection screen to a depth such that the foci of the lenticules forming the back face of the projection screen are located at the portions of the front face of the screen having the Fresnel lens indentations. Because the Fresnel lens is indented from the flat portion of the front face of the projection screen, a dark overcoating can be applied simply by brushing or rolling a coloring compound over the front surface of the projection screen. If desired, additional control of the viewing angle of the projection screen can be achieved by the insertion of convex or concave lens elements within the Fresnel lens indentations.

Figure 6:
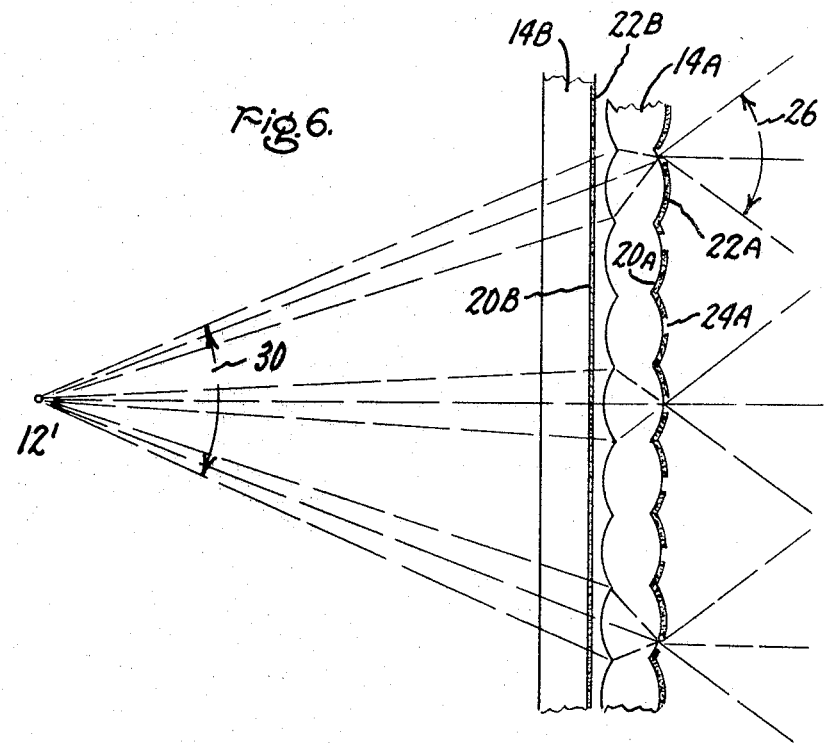

These and various other objects, features and advantages of the invention will be better understood from the following description taken in connection with the accompanying drawings in which:

FIG. 1 is a sectional view of a back projection system utilizing the composite projection screen of this invention, FIG. 2 is an enlarged sectional view of a back projection screen wherein the refracting lens component is formed from a portion of the lenticular front surface of the screen, FIG. 3 is an enlarged sectional view of a back projection screen wherein the arcual span of the lenticules forming the front face of the projection screen is smaller than the arcual span of the back lenticules, FIG. 4 is an enlarged sectional view of a back projection screen wherein the arcual span of the lenticules forming the front face of the projection screen is greater than the arcual span of the back lenticules, FIG. 5 is an isometric view of two back projection screens aligned to control both the vertical and the horizontal viewing angles, FIG. 6 is a schematic sectional view of the projection screens of FIG. 5, FIG. 7 is a schematic sectional view of a back projection screen wherein the front face is internally notched to provide a Fresnel lens configuration, FIG. 8 is a schematic sectional view of a back projection screen depicting the insertion of convex lens elements within the Fresnel lens indentations, FIG. 9 is an enlarged fragmented view of the projected screen of FIG. 8, FIG. 10 is a schematic horizontal sectional view of a back projection screen suitable for controlling both the horizontal and the vertical viewing angles, and FIG. 11 is a schematic vertical sectional view taken along lines A—A of the back projection screen of FIG. 10.

A back projection system, as shown in FIG. 1, generally includes a wide angle projector 10 to project an image on a mirrored surface 12 which surface reflects the image upon the back face of projection screen 14 to present a viewable picture on the front face of the screen. In order to minimize the depth of the back projection system for a given picture dimension, projector 10 is provided with a wide angle lens 15 which produces a projection angle of approximately 60°. For optimum centering and brightness employing the 60° projection angle, reflecting surface 12 and projection screen 14 preferably are disposed at a 30° angle relative to each other and projector 10 is situated above and slightly forward of the projection screen so that the axis of the projector forms approximately a 30° angle with the plane of projection screen 14.

Mirrored surface 12 can be any smooth, non-light absorbing material and preferably is a front reflecting mirrored surface, while projection screen 14 is fabricated from a transparent material, e.g. clear thermoplastic or transparent silicon rubber. Because projection lens 15 can be designed for a fixed throw distance due to its fixed position within the back projection system, the cost of projector 10 and the number of elements within the projector can be reduced to a minimum.

A high gain back projection screen 14 of this invention suitable for use with wide angle projection lens 15 of FIG. 1 to inhibit the formation of both hot spots at the center of screen 14 and moire is portrayed in FIG. 2. The screen is characterized by a cylindrically lenticulated back face 18 proximate mirrored surface 12 and a cylindrically lenticulated front face 20 symmetrically disposed relative to back face 18 so that cylindrical lenses 19 and 21 along the back and front faces, respectively, of screen 14 are aligned in opposition. The screen thickness T and the radial curvature of cylindrical lenses 19 are dimensioned so that an image reflected from point 12' on mirrored surface 12 is focused upon the surface of front face 20 by cylindrical lenses 19. In general, cylindrical lenses 19 and 21 are relatively small having an arcual span of approximately 10 mils and a radius of curvature of about 7 mils for a 20 mil thick screen, e.g. the radius of curvature of the cylindrical lenses preferably is approximately one-third of the thickness of the screen. The entire front face 20 of projection screen 14 is covered with an approximately 2 mil thick dark overcoating 22 at all locations except for clear sections 24 situated at the foci of lenticules 19. Each of clear sections 24 along cylindrical lenses 21 are positioned at a location intersected by an unrefracted center ray 25 projected from point 12' on mirrored surface 12 through the center of the directly opposed back cylindrical lens 19 and therefore the location of clear sections 24 are arcually progressively displaced relative to the center of the particular cylindrical lens 21 with which the section is associated as the distance from the cylindrical lens to the center of the screen increases. Each of clear sections 24 thus is situated upon a slightly different arcual segment of cylindrical lenses 21 and the clear sections form a stepped zone lens configuration relative to the projected light rays from point 12' on mirrored surface 12. The clear sections therefore function to refract the impinging light rays focused upon them by cylindrical lenses 19 thereby collimating center light rays 25 on the viewing side of the screen preferably at an angle perpendicular to the plane of the screen. Optical registration of clear sections 24 and cylindrical lenses 19 therefore is accomplished in the screen depicted in FIG. 2 by locating clear sections 24 at the foci of cylindrical lenses 19. The refraction of the light rays passing through the screen inhibits the formation of areas of excessive illumination at the center of screen 14 and permits clear sections 24 to be situated at relatively obscure locations along the curved surface of the screen. By focusing cylindrical lenses 19 upon the front surface of the projection screen, the viewing angle is maximized for a given screen thickness.

The preferred method of selectively applying dark overcoating 22 upon cylindrical lenses 21 is to coat the entire front face of the projection screen with an approximately 2 mil thick layer of dyed photoresist 22 and subsequently to etch the photoresist at the foci of cylindrical lenses 19. The precision of dyed photoresist removal afforded by etching minimizes the required tolerance in the size of clear sections 24 thereby darkening the overall appearance of the picture screen. If desired, other methods such as deposition of the overcoating utilizing a mask also can be employed to selectively coat front face 20 of projection screen 14.

In the projection of pictorial displays, a center ray from projector 10 is reflected by point 12' on mirrored surface 12 to impinge on back face 18 of selectively transparent projection screen 14 and cylindrical lenses 19 focus the impinging rays upon clear sections 24 of front face 20. The light rays pass through clear sections 24 and are refracted at an angle relative to the projection screen determined both by the geometry of the arcual components of cylindrical lenses 21 forming the clear sections and by the angle of impingement of the light rays. The refraction aligns viewing angles 26 of each clear section 24 relative to the plane of projection screen 14 with center light ray 25 preferably being disposed approximately perpendicularly to the plane of the projection screen. The permissive viewing angle 26 and the subtended angle of projection 30 from point 12' on mirrored surface 12 are identical when the front and back cylindrical lenses are symmetrically disposed relative to each other.

When the center-to-center spans of cylindrical lenses 19 and 21 are unequal so that front face 20 is non-symmetrical with back face 18, viewing angle 26 will differ from the subtended angle of projection 30 from point 12' on mirrored surface 12. In non-symmetrical projection screens, as depicted in FIGS. 3 and 4, the cylindrical lenses situated at the center of front face 20 and back faces 18, respectively, are aligned in direct opposition with the alignment of the opposed cylindrical lenses progressively diminishing in proportion to the departure of the lenses from the center of the screen. The degree of non-alignment between front cylindrical lenses 21 and back cylindrical lenses 19 is relatively small preferably being less than the span of a single lens for the entire projection screen.

During the projection of an image, light rays are reflected from point 12' of mirrored surface 12 to impinge upon cylindrical lenses 19 which lenses focus the rays upon clear sections 24. Clear sections 24 again lie within the unrefracted light path of center light rays 25 extending from point 12' through the center of cylindrical lenses 19 and function to refract light rays passing therethrough.

The degree of refraction of light rays passing through each front cylindrical lens of projection screen 14 generally is dependent upon the point of impingement of center light rays 25 relative to the center of the front cylindrical lens and increases with increasing departure of the point of impingement of center light ray 25 from the center of the front cylindrical lens. When the arcual span of front cylindrical lenses 21 are smaller than the arcual span of back cylindrical lenses 19, as depicted in the projection screen of FIG. 3, center light rays 25 impinge upon front cylindrical lenses 21 at segments generally further removed from the centers of the front cylindrical lenses than in the symmetrical projection screen depicted in FIG. 2. The degree of refraction of center light rays 25 produced by cylindrical lenses 21 of the projection screen of FIG. 3 therefore is increased relative to the degree of refraction of front cylindrical lenses equally distant from the center of a symmetrical projection screen and, in order to provide a collimation of center light rays 25 upon the viewing side of the projection screen, the subtended angle of projection 30 must be increased by any of the known conventional methods, e.g. by an alteration in the projection distance from projector 10 to mirrored surface 12. The increase in the subtended angle of projection 30 from point 12' on mirrored surface 12 effectively functions to shorten the projection distance from point 12' on mirrored surface 12 to projection screen 14 thereby altering the angle of impingement of center light rays 25 upon clear sections 24 of front cylindrical lenses 21 to the extent necessary to produce a collimation of center light rays 25 on the viewing side of the projection screen. Viewing angle 26, which primarily is determined by the focal length of cylindrical lenses 19 and the thickness of screen 14 remains constant. Thus for a fixed viewing angle, the non-symmetrical screen of FIG. 3 permits an increased subtended angle of projection relative to the subtended angle of projection of symmetrical projection screens.

When the arcual span of cylindrical lenses 21 is larger than the arcual span of cylindrical lenses 19, as portrayed in FIG. 4, center light rays 25 impinge upon front cylindrical lenses 21 at segments nearer the center of the front cylindrical lenses than in symmetrical projection screens. The degree of refraction of center light rays 25 produced by front cylindrical lenses 21 of the projection screen of FIG. 4 therefore is decreased relative to the degree of refraction of front cylindrical lenses equally distant relative to the center of symmetrical projection screens. In order to collimate center light rays 25 upon the viewing side of the projection screen, the projection distance from point 12' on mirrored surface 12 to projection screen 14 must be increased thereby decreasing the subtended angle of projection 30. Thus an image reflected from point 12' on mirrored surface 12 at a subtended angle of projection 30 is refracted by cylindrical lenses 19 to produce a viewing angle 26 wider than the subtended angle of projection 30 because of the locations of clear sections 24 relative to the centers of the associated front cylindrical lenses 21. Variations between the subtended angle of projection and the viewing angle also can be effectuated by other variations in the geometries of the lenses, e.g. by varying the radius of curvature of front cylindrical lenses 21 relative to back cylindrical lenses 19 or by an unequal spacing between lens elements of identical arcual configurations.

When it is desired that both the vertical viewing angle and the horizontal viewing angle be separately controllable, two back projection screens 14A and 14B similar to the back projection screen of FIG. 2 can be utilized to form a composite projection screen, as portrayed in FIGS. 5 and 6. The sheets are placed in juxtaposition with the direction of the cylindrical lenses on sheet 14A being angularly positioned relative to the cylindrical lenses on sheet 14B. Although an orthogonal relationship between the cylindrical lenses is depicted because of the relative simplicity of alignment between the interrelated units, any angular disposition of the two back projection screens is permissible. The front faces 20A and 20B of cylindrical projection screens 14A and 14B remote from reflecting surface 12 are covered with dark overcoatings 22A and 22B, respectively, at all locations except for clear sections 24A and 24B situated at the foci of the cylindrical lenses forming the rear portions of the sheets. Because of the orthogonal relationship of the projection screens, screen 14A functions as the projection screen depicted in FIG. 1 to control the horizontal viewing angle 26 while projection screen 14B functions to control the vertical viewing angle (not shown).

FIG. 7 discloses an alternate arrangement of this invention wherein the front face 20 of back projection screen 14 is generally flat with a Fresnel lens 34 being notched into the front face of the projection screen. The back face 18 of the screen again is shaped in a cylindrical lens configuration 19 with the number of indentations within the front face corresponding to the number of cylindrical lenses forming the back face of the projection screen, e.g. a Fresnel lens indentation is provided for each cylindrical lens. The thickness of the screen and the curvature of the cylindrical lenses are so chosen that the foci of the lenses are located along the front face of the screen at the corresponding Fresnel lens indentation.

In the projection of a picture, light rays are reflected from point 12' upon back cylindrical lenses 19 and are focused upon Fresnel lens 34 along the front face of the screen to be refracted in accordance with the angular positioning of the Fresnel lens. The relationship between the viewing angle 26 and the subtended angle of projection 30 therefore generally is determined by the angular disposition of Fresnel lens 34, the focal length of cylindrical lens 19 and the thickness of screen 14.

Because the Fresnel lens is recessed, dark overcoating 22 can be applied easily by painting or rolling the darkened overlayer on the flat face of the projection screen. The recessed Fresnel lens 34 is not coated by the application of the overlayer and there is no necessity to subsequently remove selected portions of darkened overcoating as in the previously disclosed screens wherein lenticules were utilized to form the refracting lens component of the front face of the screen.

When the viewing angle 26 of the projection screen having a notched Fresnel lens is not adequate, a supplementary lens element can be incorporated within the notched Fresnel lens to form a composite lens 40 possessing the desired viewing angle, as is shown in FIG. 8. The supplementary lens element can have either a convex curvature as depicted more clearly in the enlarged view of FIG. 9 or a concave curvature (not shown) and preferably is molded in the projection screen simultaneously with the molding of the other surfaces. Thus light reflected by mirrored surface 12 and focused upon the composite lens 40 by cylindrical lenses 18 is refracted by the Fresnel lens component while simultaneously being diffused by the convex component incorporated within the Fresnel lens. By the proper choice of front and rear lenses, the viewing angle 26 can be set at any desired degree.

Although the configurations of the various screens, depicted in FIGS. 1–9, have been described as having a cylindrical lens configuration because of the relative ease of shaping cylindrical lenses during manufacture of a projection screen, it should be understood that spherical lenses also can serve as the focusing lens component of the screen.

Control of both the horizontal and the vertical viewing angles by a unitary projection screen can be accomplished by lenticulating the back face of the projection screen in a spherical lens configuration and forming refracting lens components in both the front and back faces of the screen in optical registration with the spherical lens components, as depicted in FIGS. 10 and 11. Thus the back face of the screen is formed in at least one direction in a lens configuration which combines the geometric shapes of both a Fresnel lens and a spherical lens. As will be noticed from FIG. 10 wherein a schematic horizontal section of a projection screen having the composite lens configuration in a horizontal direction is depicted, the arcual curvature of the composite lens 60 is rounded from a pure Fresnel lens curvature by the influence of the spherical lens and extends inwardly approximately one-third the thickness of the screen. The arcual curve itself can be defined as the loci of points situated at the midpoint between a Fresnel lens and a lenticular lens having center lens elements focused upon a common point. Thus the Fresnel lens component functions to refract light rays reflected by mirrored surface 12 while the spherical compoent serves to focus the light rays upon cylindrical notches 62 formed vertically along the front face 64 of the screen. Although cylindrical notches 62 which serve to magnify the horizontal viewing angle 26 relative to the subtended angle of reflection 30 from surface 12 are depicted as having the configuration of convex lenses, concave lens elements situated at the foci of the spherical lenses along the back face of the screen also can be utilized to assist in controlling the viewing angle of the screen. The front face of the screen is overlaid with an optically etched dark overcoating 22 to present a darkened appearance for high contrast viewing.

The front face 64 of the screen, as shown in vertical section in FIG. 11, is formed vertically within cylindrical notches 62 in the configuration of a Fresnel lens while the rear face of the screen is spherically shaped in the vertical direction into lenses 63 to focus the light rays upon the Fresnel lens components of front face 64. The respective vertical geometries of the front and rear faces of the projection screen control the relationship between the vertical projection angle 68 and the vertical viewing angle 66. A single screen therefore suffices to control both the horizontal and vertical viewing angles when at least one face of the screen has a lens configuration combining the geometric shapes of a Fresnel lens and a spherical lens.

While several examples of this invention have been shown and described, it will be apparent to those skilled in the art that many changes and modifications may be made without departing from this invention in its broader aspects; and therefore the appended claims are intended to cover all such changes and modifications as fall within the true spirit and scope of this invention.

What I claim as new and desire to secure by Letters Patent of the United States is:

1. A back projection screen for pictorially displaying upon the front face of the projection screen an image projected upon the back face of the screen comprising a plurality of focusing lens components situated along the back face of said projection screen proximate said image, the radius of curvature of said focusing lens components being so dimensioned relative to the thickness of said screen that the foci of said focusing lens components are located along the front face of said screen, a darkened overcoating covering the front face of said screen at all locations except the foci of said focusing lens components and a plurality of refracting lens components formed along the front face of said screen at the foci of said focusing lens components for refracting light rays passing therethrough to a generally perpendicular attitude relative to the plane of said screen, said refracting elements being disposed along the path of a center light ray from a selected projection source impinging upon and passing through said focusing lens components in an unrefracted manner.

2. A back projection screen according to claim 1 wherein the front face of the projection screen is lenticulated to form a plurality of lens elements selected from the group consisting of cylindrical lens elements and spherical lens elements and the refracting lens components are selected arcual segments of the lens elements forming the front face of the projection screen, said selected segments of each front lens element being arcually displaced by increasing spans relative to the center of the lens element with increased departure of the lens element from the center of the screen.

3. A back projection screen according to claim 2 wherein the lens elements along the front face of the projection screen are aligned in direct opposition with the focusing lens components along the back surface of the projection screen.

4. A back projection screen according to claim 2 wherein the center lens element along the front face of the projection screen and the center focusing lens component on the back face of the projection screen are in direct alignment, and the center-to-center span of the front lens elements differ from the center-to-center span of the back focusing lens components.

5. A back projection screen according to claim 2 wherein the focusing lens components forming the back face of said projection screen and the lens elements along the front face of said projection screen have the arcual configuration of cylindrical lenses.

6. A back projection system comprising:
   a reflective surface,
   means for projecting an image upon said reflective surface, and
   a projection screen according to claim 2 disposed at an angular attitude relative to said reflective surface so that a projected image reflected by said reflective surface impinges upon the back face of said screen.

7. A back projection system according to claim 6 further including a second back projection screen according to claim 3 interposed between said reflective surface and the first projection screen with the lenticular lens components of said second projection screen being positioned at an angular attitude with the lenticular lens components on the back surface of said first projection screen.

8. A back projection screen according to claim 1 wherein the front face of the projection screen is generally flat and the refracting lens components are Fresnel lens indentations selectively notched internally of the flat portion of the front face of the projection screen.

9. A back projection screen according to claim 8 including a diffusing lens component incorporated within the indented Fresnel lens components.

10. A back projection screen for pictorially displaying upon the front face of the projection screen an image projected upon the back face of the screen comprising a plurality of compisite lenses disposed along the back face of said screen, said composite lenses being defined by an arcuate curve having the configuration of the loci point situated at the midpoint of a refracting lens and focusing lens having center lens elements focused upon a common point, the radius curvature of said focusing lens components being so dimensioned relative to the thickness of said screen that the foci of said focusing lens components are located along the front face of said screen, a darkened overcoating covering the front face of said screen at all locations except the foci of said focusing lens components and a plurality of refracting lens components formed along the front face of said screen at the foci of said focusing lens components for refracting light rays passing therethrough to a generally perpendicular attitude relative to the plane of said screen, said refracting lens components being disposed along the path of a center light ray from a selected projection source impinging upon and passing through the center of said composite lens components situated along the back face of said screen.

11. A projection screen according to claim 10 wherein the refracting lens components along the front face of the screen refract light at a perpendicular attitude relative to the light refraction angle of the refracting lens components along the back face of the screen.

12. A projection system comprising:
a reflective surface,
means for projecting an image upon said reflective surface and
a projection screen according to claim 10 disposed to receive said projected image upon the back face of said screen.

13. A back projection screen for pictorially displaying upon the front face of the projection screen an image projected upon the back face of the screen comprising a plurality of composite lenses disposed along the back face of said screen, said composite lenses being defined by an arcuate curve having the configuration of the loci points situated at the midpoint of a refracting lens and focusing lens having center lens elements focused upon a common point, the radius curvature of said focusing lens components being so dimensioned relative to the thickness of said screen that the foci of said focusing lens components are located along the front face of said screen, a darkened overcoating covering the front face of said screen at all locations except the foci of said focusing lens components and a plurality of diffusing lens components formed along the front face of said screen at the foci of said focusing lens components for magnifying the viewing angle of said screen.

References Cited

UNITED STATES PATENTS

| | | | |
|---|---|---|---|
| 1,942,841 | 1/1934 | Shimizu | 350—128 |
| 1,970,358 | 8/1934 | Bull et al. | 350—127 |
| 2,271,196 | 1/1942 | Kaszab | 350—128 |
| 2,292,152 | 8/1942 | Newcomer | 350—127 |
| 2,618,198 | 11/1952 | Luboshez | 350—128 |

JULIA E. COINER, Primary Examiner

U.S. Cl. X.R.
350—128